United States Patent
Lang et al.

(10) Patent No.: US 12,500,919 B2
(45) Date of Patent: Dec. 16, 2025

(54) METHOD AND SYSTEM FOR ENSURING COMPLIANCE OF COMPUTING SYSTEMS

(71) Applicant: ObjectSecurity LLC, San Diego, CA (US)

(72) Inventors: Ulrich Lang, San Diego, CA (US); Reza Fatahi, Encino, CA (US); Jason Kramer, Studio City, CA (US); Trevor Thomas, Verona, WI (US); Holmes Chuang, Las Vegas, NV (US); Federico Aragon, San Diego, CA (US)

(73) Assignee: Object Security LLC, San Diego, CA (US)

( * ) Notice: Subject to any disclaimer, the term of this patent is extended or adjusted under 35 U.S.C. 154(b) by 299 days.

(21) Appl. No.: 18/237,120

(22) Filed: Aug. 23, 2023

(65) Prior Publication Data
US 2024/0073238 A1 Feb. 29, 2024

Related U.S. Application Data

(60) Provisional application No. 63/400,331, filed on Aug. 23, 2022, provisional application No. 63/400,338, filed on Aug. 23, 2022.

(51) Int. Cl.
*H04L 9/40* (2022.01)

(52) U.S. Cl.
CPC .......... *H04L 63/1433* (2013.01); *H04L 63/20* (2013.01)

(58) Field of Classification Search
CPC ............................ H04L 63/1433; H04L 63/20
USPC ........................................................... 726/22
See application file for complete search history.

(56) References Cited

U.S. PATENT DOCUMENTS

| | | | |
|---|---|---|---|
| 10,277,619 B1* | 4/2019 | Clark, II | H04L 63/1433 |
| 11,895,121 B1* | 2/2024 | Karim | H04L 63/20 |
| 2017/0214701 A1* | 7/2017 | Hasan | H04L 63/1433 |
| 2020/0272734 A1* | 8/2020 | Tora | G06F 21/565 |
| 2023/0100142 A1* | 3/2023 | Karimibiuki | G06F 16/2468 |
| | | | 726/25 |
| 2023/0319099 A1* | 10/2023 | Karimibiuki | H04L 63/145 |
| | | | 726/23 |

* cited by examiner

*Primary Examiner* — Teshome Hailu
(74) *Attorney, Agent, or Firm* — Muncy, Geissler, Olds & Lowe, P.C.

(57) ABSTRACT

Method and system for analyzing computing devices for properties of at least one computer software in the at least one computing system, includes loading, input data for at least one computer software; determining a result pertaining to vulnerabilities present or expected to be present within the computer software; mapping vulnerabilities to frameworks, determining a result pertaining to the outcome of the vulnerability-to-framework mapping; generating, an output data describing the at least one result; storing the output data pertaining to the result in a memory; and determining, if the result satisfies a predetermined condition, and if so, executing an action corresponding to the result on the computing system.

24 Claims, 6 Drawing Sheets

High-level Architecture of an Example of the Compliance Analysis Engine
Applied to Binary Analysis

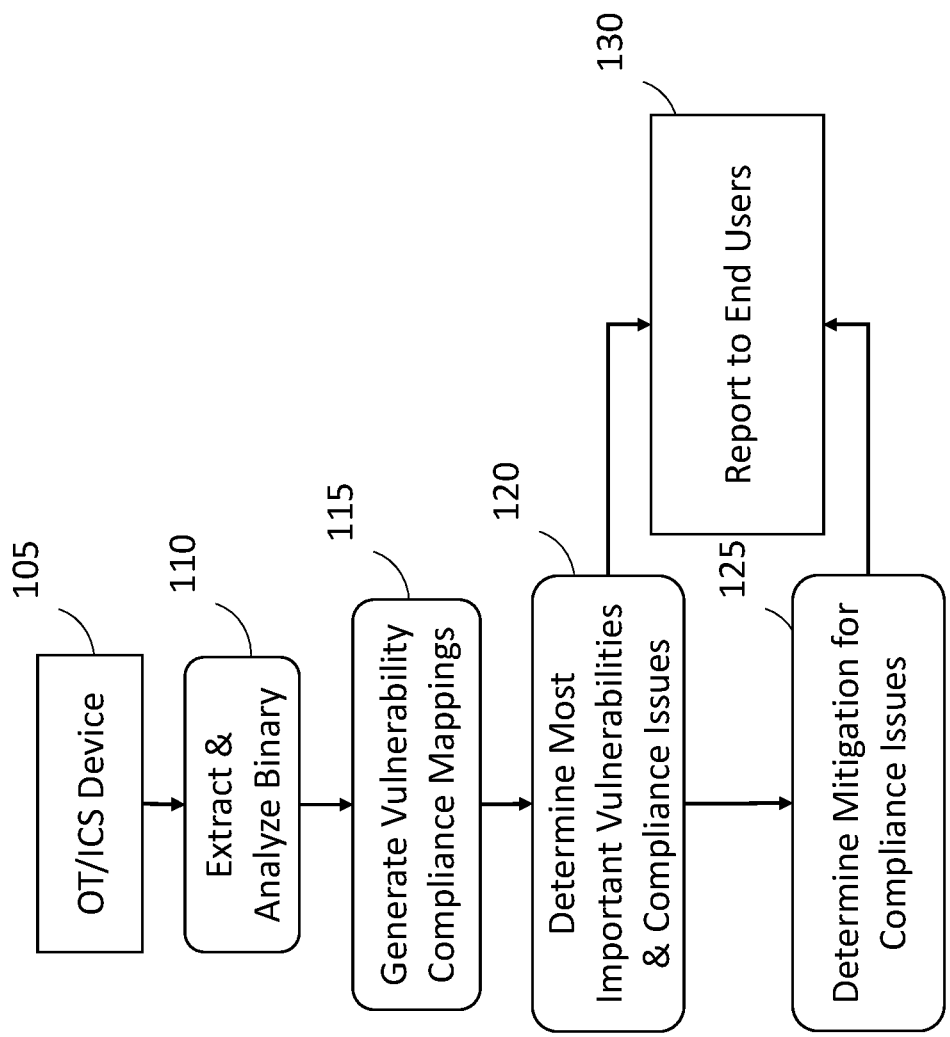
FIG 1: High-level Flow-chart of the Compliance Analysis Engine

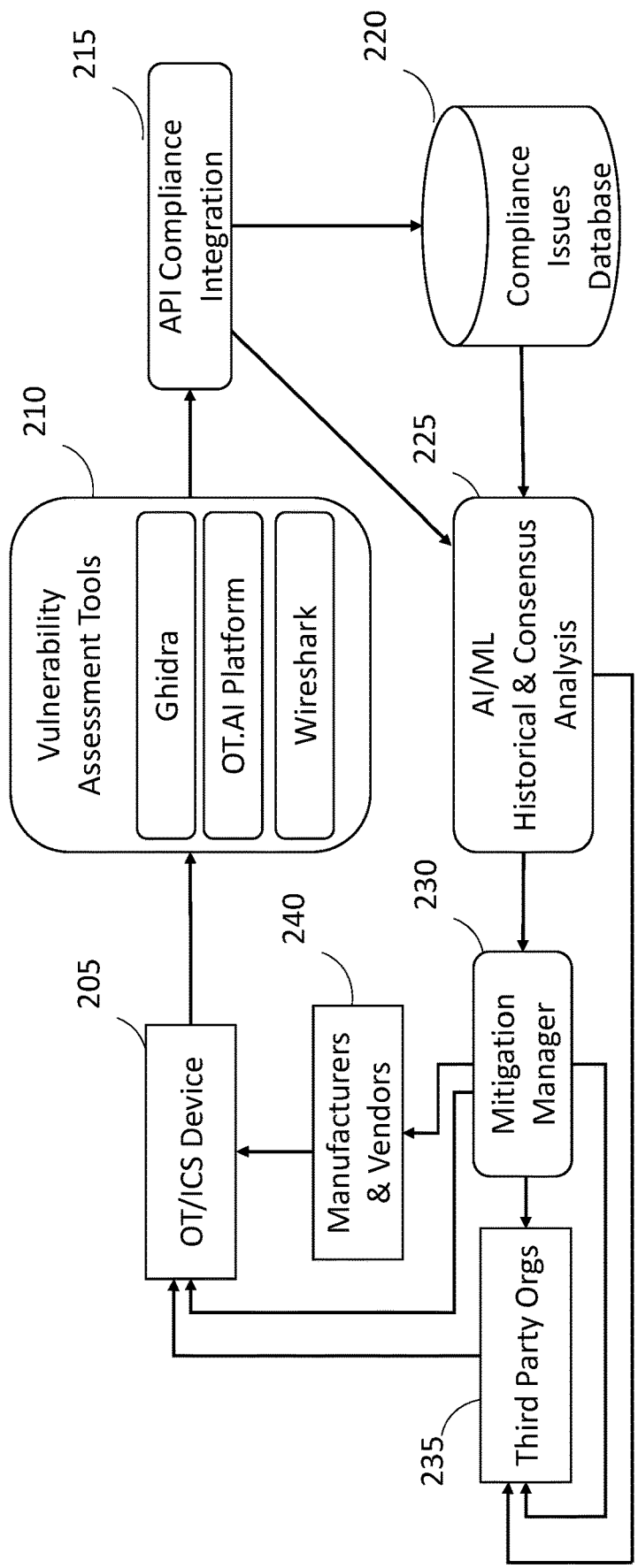
FIG 2: High-level Architecture of an Example of the Compliance Analysis Engine Applied to Binary Analysis

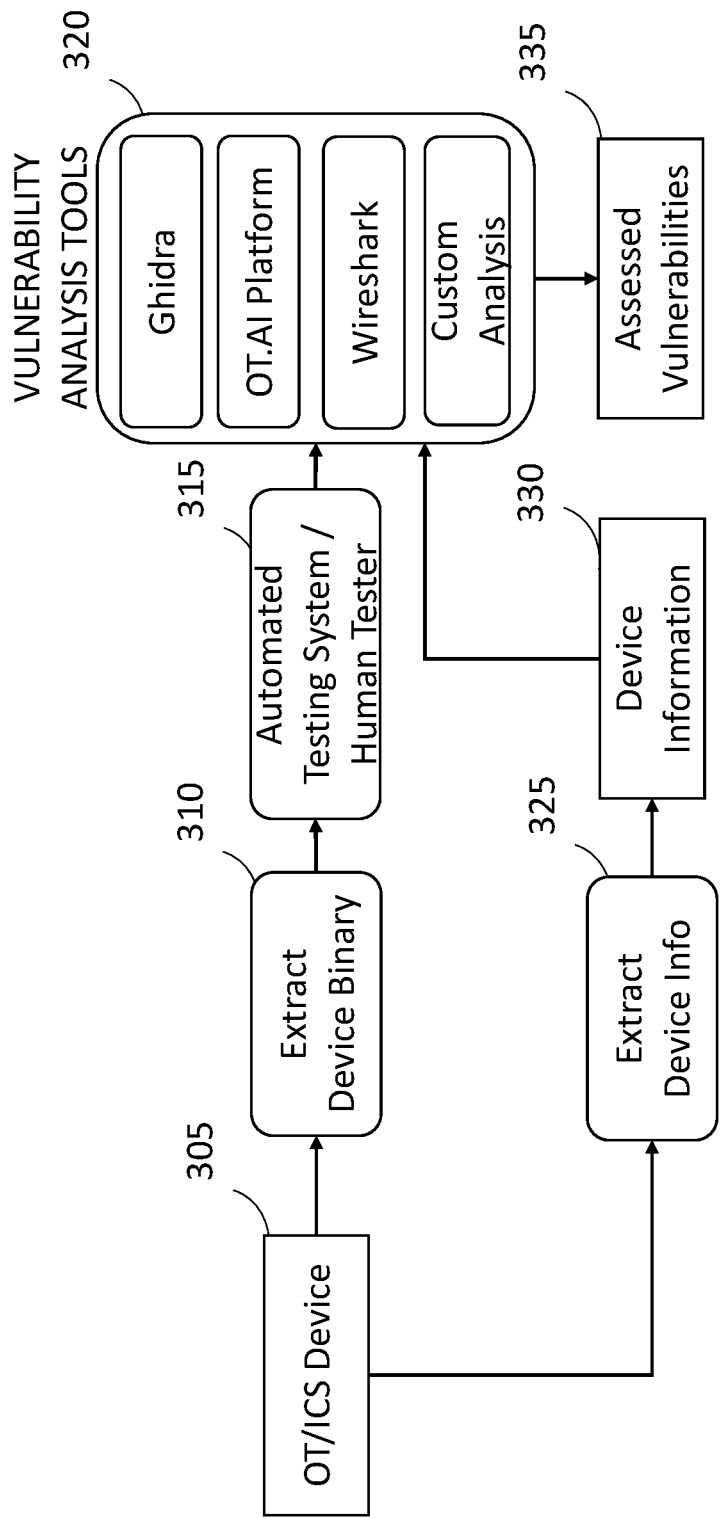
FIG 3: Function of the Vulnerability Assessment Tools Module Applied to Binary Analysis

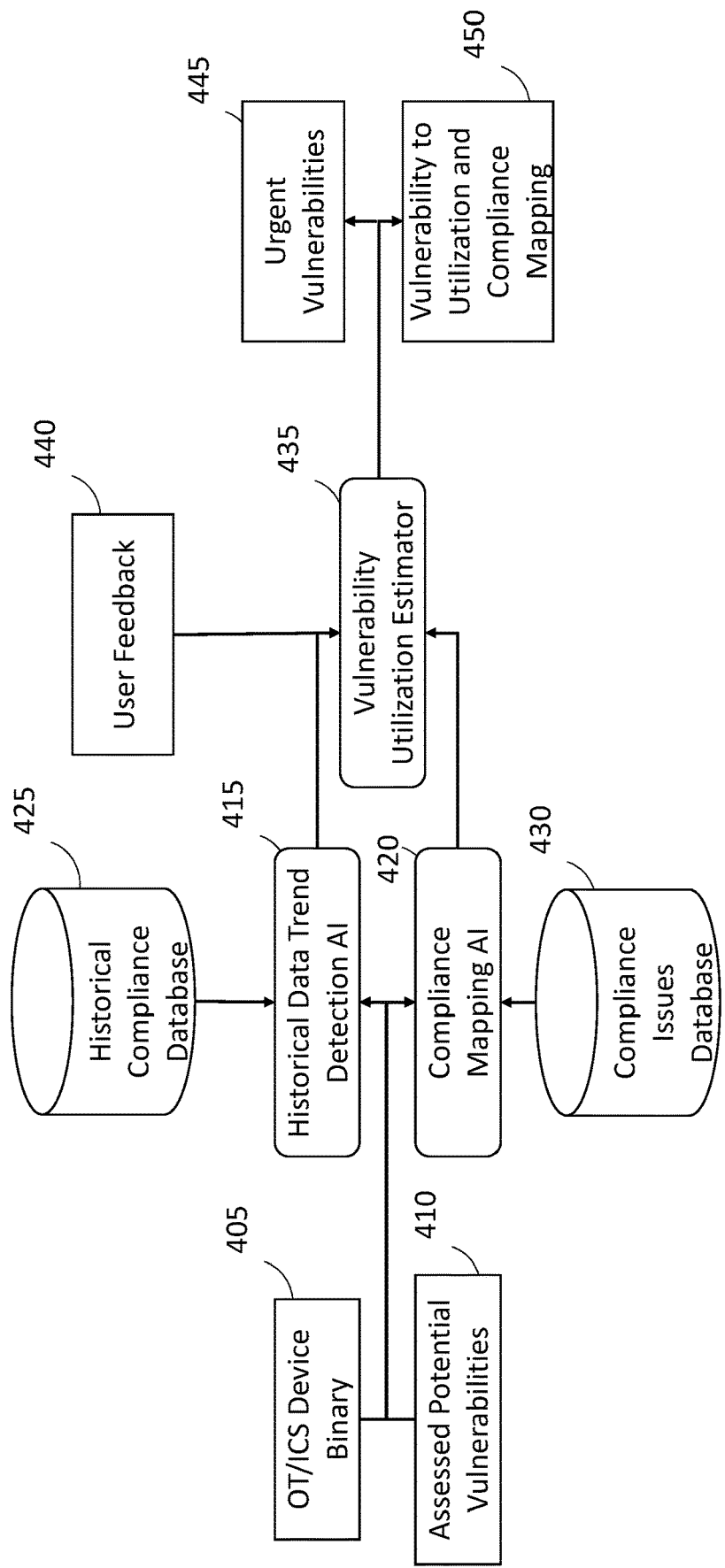
FIG 4: High-level Description of the AI/ML Historical & Consensus Analysis Module

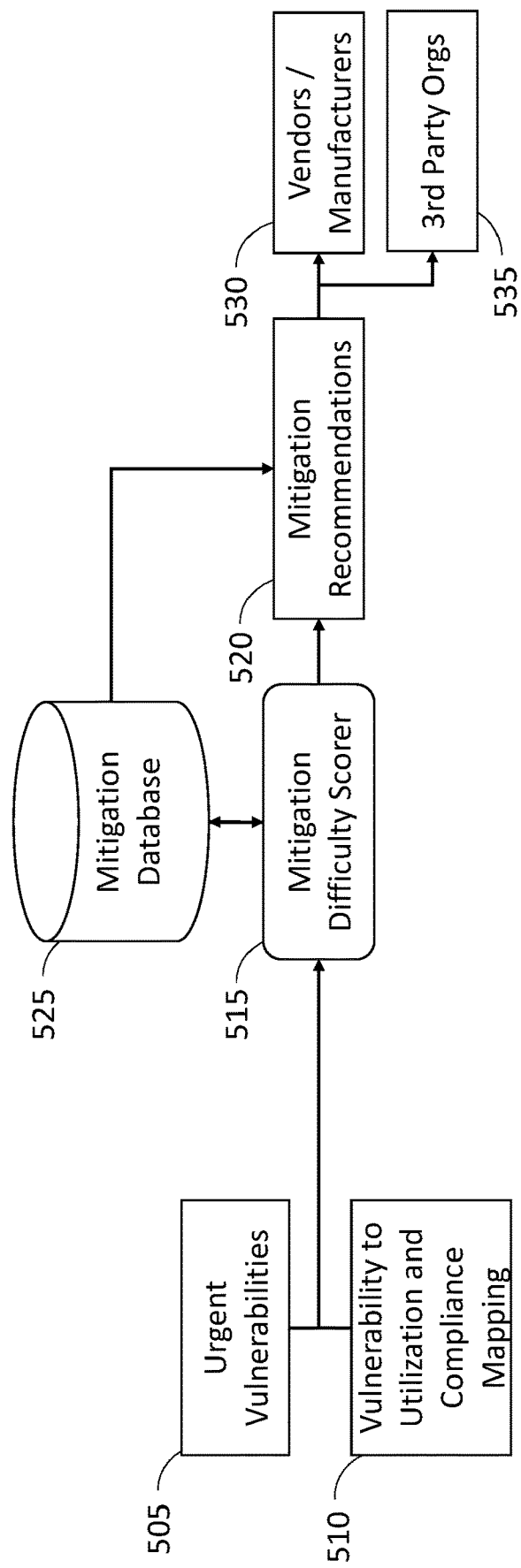
FIG 5: High-level Description of the Mitigation Management Module

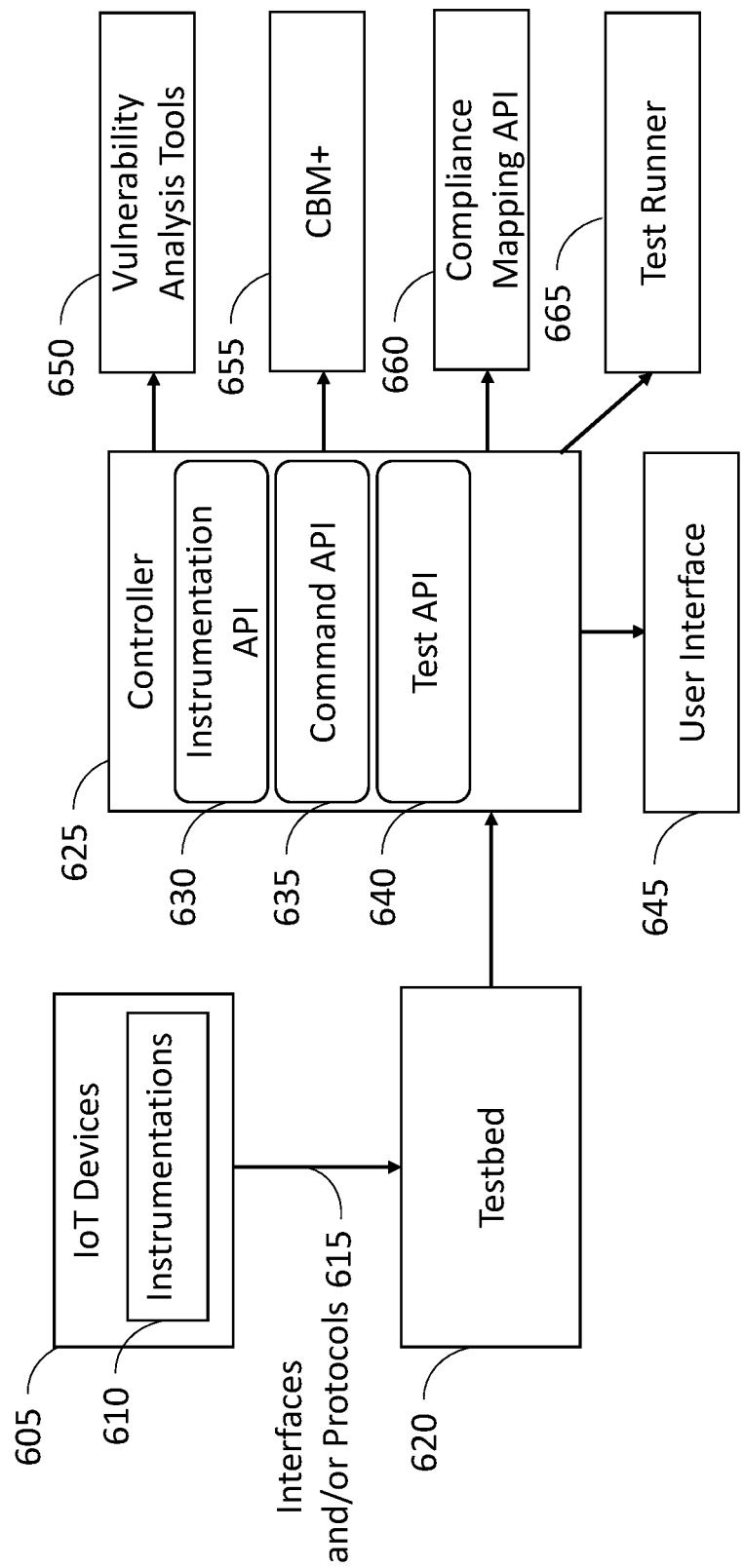
FIG 6: Function of the invention for analyzing and testing IoT devices

METHOD AND SYSTEM FOR ENSURING COMPLIANCE OF COMPUTING SYSTEMS

This application claims priority to U.S. Provisional Application Nos. 63/400,331 entitled "Method and System for Ensuring Compliance of OT/ICS Systems", and 63/400,338 entitled "Method and System for Testing, Analyzing, and Securing IoT Systems", which were both filed on Aug. 23, 2022, and which are both incorporated herein by reference.

This invention was made with government support under N683352000094 awarded by United States Navy. The government has certain rights in the invention.

BACKGROUND OF THE INVENTION

Field of the Invention

This invention relates to a novel method and system to map vulnerabilities identified in computing systems, including in computing software, to compliance frameworks. Examples of the invention communicate vulnerabilities information between organizations and manufacturers to improve and create comprehensive compliance control mappings, for example through new sub-controls. Examples of the invention utilize AI/ML to automatically analyze vulnerabilities and compliance frameworks from numerous organizations, and derive unique mappings between the two. The invention determines rank of vulnerabilities and compliance issues from vulnerabilities, across one or more computing systems. It utilizes various methods, including Artificial Intelligence and Machine Learning (AI/ML) neural networks such as Natural Language Processing (NLP) systems, consensus analysis systems, and algorithms to generate mitigation methods for vulnerabilities and compliance issues, and generates reports for organizations and manufacturers to easily comprehend and communicate issues within their computer systems, the vulnerabilities associated with them, and how to mitigate/remediate these issues. This gives the users of the invention ready access to compliance framework data, and automatically generate information about their organization's cybersecurity posture and readiness.

Description of Related Art

Cybersecurity and compliance are important for computing systems, including IT systems and OT/ICS systems. While the presented related art is mostly described in the exemplary context of OT/ICS, it applies analogously to IT and any computing systems in general. Since OT/ICS devices are connected to the physical environment, a compromise of these devices can cause physical damage, which can be especially dangerous when the system is a part of critical infrastructure. Cyber-attacks on critical infrastructure can have severe supply chain damage, impact production, or even cause physical harm, such as fires or explosions. An attack on the energy sector, for example, can cause a chain reaction of economic and physical damage to other connected critical infrastructure environments, such as hospitals, electric utilities, wastewater treatment plants, etc.

There are currently several complications with defending against and mitigating potential threats, such as ransomware. Existing vulnerability detection is slow and often limited to organizations with leading resources (esp. technical know-how). As automation of these tasks is beginning (2022) to roll out, there needs to be some method of validating findings and building consensus assuming that new automations will initially contain false positive findings. Currently, no such method(s) exists. Organizations rely on manufacturers to produce patches because they often do not have access to the source code, and making direct changes to the OT/ICS and IT device binaries may void the device warranty or change device functionality causing downtime or physical damage to the device and resulting in economic loss. Obtaining patches from manufacturers can be difficult and time-consuming, sometimes taking weeks to months to patch a vulnerability. Devices may remain in operation for several decades, and typically, legacy devices are more prone to vulnerabilities and are more likely to have little to no support from manufacturers. NIST SP 800-82 states that "legacy systems may be unable to adequately support cybersecurity to prevent risks from exceeding organization tolerance levels." When for example a legacy device is unable to be patched, organizations may either opt to leave the device in a vulnerable state to avoid downtime or breaking the device, implement mitigations external to the device, or consider replacing the device entirely in an effort to become more secure. Delays in the release of firmware patches, software patches, and updates can lead to increased exposure to cyber-attacks. OT/ICS and IT device end-users may be uncertain if the zero-day vulnerabilities identified in their infrastructure are unique to their devices or if the issues are widespread across several organizations with the same device.

For manufacturers of OT/ICS and IT devices, patching can be time-consuming and expensive. There may be too many patches and issues for manufacturers to keep up with. Manufacturers have to confirm that any patch or update does not change the functionality of the device. Vulnerabilities may go unpatched by manufacturers because customers are not reporting vulnerabilities upon discovery. Additionally, there is no way to enforce manufacturer accountability and urgency around patching when they are aware of a necessary patch that their customers are not aware of.

Most organizations do not have a system in place to close the loop between OT/ICS and IT vendors, third parties, and their customers to send vulnerabilities and receive patches. Organizations use their own set of asset inventory management and vulnerability assessment tools and have no way to get their assessment results back to the manufacturer in an easy and automated way. This lack of a medium for vulnerability and NIST OT/ICS and IT RMF control compliance between stakeholders increases risk by causing delays in remediation and slows the spread of cyber threat intelligence.

Being able to securely share device vulnerability information with third-party organizations is becoming increasingly important. On May 12, 2022, the White House issued Executive Order (EO) 14028 on "Improving the Nation's Cybersecurity." The EO covers the protection, security, and safety of OT. Section two of EO 14028 describes removing barriers to sharing threat, incident, and risk information to close the information gap between the government and private sector, and the EO also calls for improving investigative and remediation capabilities. It is imperative to both the government and private sector that vulnerability information is accessible and is presented in a uniform and understandable way so that other organizations can also be protected from the same threats. At the same time, the communication channel of vulnerability information must be locked down so that adversaries do not gain access to the details of an organization's vulnerabilities. Organizations currently have very few options to remediate vulnerabilities discovered. If they do not want to wait for a patch from the manufacturer, they may mitigate them by, for example, blocking a port, removing unnecessary connections from an OT/ICS or IT device, or adding a diode to physically enforce one-way data flow, etc.

Additionally, the current OT/ICS and IT vulnerability assessment tool landscape is a crowded market, and there is no standard, API, or format for automated assessment results that can be easily mapped to controls from frameworks like NIST. Moreover, NIST controls tend to be vague and not very detailed. For example, for binary analysis, assessments may need to map a buffer overflow vulnerability to a NIST control. However, there is no control specific enough that describes buffer overflows. Instead, the buffer overflow vulnerabilities may be mapped to the control RA-5 "Vulnerability Monitoring and Scanning." If there is a related NIST control enhancement to the vulnerability found, the vulnerability may also be mapped to this enhancement. However, these controls could be utilized and mapped much easier if sub-controls were provided for more distinct mappings.

Currently (2023), OT/ICS cybersecurity specialists perform asset device inventory management and connect approximately 25 to 70 percent of the OT/ICS devices to continuous behavior monitoring using SIEM systems. The skill level for their position is very high, and there is too much data for them to analyze and assess from assessing component risk to network security to checking patches for Common Vulnerabilities and Exposures (CVEs) on possibly hundreds or even thousands of devices. OT/ICS cybersecurity specialists discover vulnerabilities on the firmware and from the network. They analyze tool results, behavioral network traffic systems, highlight suspicious security events, etc., and report security results. For example, Common Platform Enumeration (CPE) is a method of classifying devices, operating systems, and applications with known CVEs. When a vulnerability is found, skilled OT/ICS cybersecurity specialists prepare a remediation plan without making modifications to the device itself or device firmware/software, such as removing unnecessary connections from an ICS. OT/ICS cybersecurity specialists review the identified vulnerabilities to see if it has been published, e.g., on the National Vulnerability Database (NVD), or if a patch already exists. Typically, the next step is to issue a remediation support ticket to review and fix the vulnerability.

Applying updates and patches can be costly and time-consuming (esp. for OT/ICS, but also for IT) for cybersecurity specialists, who are already overwhelmed with devices to manage and issues to remediate. It is for example not uncommon to encounter a vulnerability on a legacy or fragile OT/ICS device, which introduces a new set of related complex vulnerability remediation issues. Triaging OT/ICS device vulnerability remediation can be overwhelming, which involves reviewing hundreds of e.g., CVEs and e.g., CWEs, placing OT/ICS device manufacturers in a situation of balancing portfolio cost management issues and may delay, or worse, not address issuing firmware and software patches and updates. If vulnerabilities are left unpatched and an organization's devices are attacked with ransomware, a typical ransomware incident can cost the OT/ICS device end-user can have a lasting impact on device safety and security and cost companies millions.

The core concept of the present invention addresses these challenges OT/ICS and IT cybersecurity specialists face by allowing them or a compliance firm to map vulnerabilities and issues found to NIST RMF (and other) controls. The present invention also gives organizations the ability to continuously map and monitor NIST controls through an API (e.g., OpenAPI) integration. The present invention "closes the loop" between organizations and manufacturers, as well as other third parties that NIST and other organizations are working with, to ensure compliance guidelines are being met. It performs AI/ML historical and consensus analysis to automatically map cybersecurity analysis results and analyze them across organizations, tools, and time.

Testing, especially security and vulnerabilities testing at all layers, plays a major in risk analysis and risk mitigation and is required to determine whether a system meets its defined requirements. The protection, testing, and continuous risk management of complex and large IoT systems is an enormous challenge, and existing IoT testing capabilities do not address associated nuances, such as a lack of focus on all life cycle phases. Challenges in IoT resilience and readiness include the identification and authentication of all devices, which also covers small sensors with very limited resources, the initial secure configuration of the system, authorization of all interactions, the detection, assessment and reporting of vulnerabilities, threats, incidents, anomalies and disruption of system components, analyzing if IoT devices follow compliance frameworks, and the generation of an actionable cyber risk picture in near real time.

It is becoming increasingly difficult to keep pace with the amount of cybersecurity tools organizations utilize, with the growing complexity of network environments, with the more advanced and frequent attacks, with the abundance of information coming in from cybersecurity tools, and with managing and testing thousands of IoT devices. Additionally, security teams are often limited in staff and consistently have a backlog of tasks, mitigations, logs, and to ensure security compliance frameworks are being followed. The large volume of incoming data to have to process and analyze makes it impossible to test and analyze all IoT devices, especially with large quantities of connections that become prohibitive, either due to high cost, lack of skilled personnel, etc. Therefore, IoT testing, cybersecurity protection, including the detection of intrusions and anomalies, and also the response to such incidents, has to be as automated as possible to assure readiness and resilience of systems that contain embedded IoT technology.

Since they are connected to the physical environment, a virus or hack, or even a failure or malfunction on IoT can cause physical damage, which can be especially dangerous when the system is a part of critical infrastructure. Cyber attacks on critical infrastructure can have severe supply chain damage, impact production, or even cause physical harm, such as fires or explosions. An attack or malfunction in the energy sector, for example, can cause a chain reaction of economic and physical damage to other connected critical infrastructure environments, such as hospitals, electric utilities, wastewater treatment plants, etc. The attack surface is becoming more and more complex. A significant challenge is being able to be resilient against vulnerabilities and malfunctions. Another major challenge is that there are many different IoT platforms and many specialized IoT hardware and software configurations. Existing approaches only cover a small subset of the full IoT platform landscape and available IoT communications protocols. Lastly, devices are becoming more reliant on third party software and services, which makes it more difficult for developers and security personnel to test the entirety of the device.

BRIEF DESCRIPTION OF DRAWINGS

FIG. 1: A high-level flow-chart of the compliance analysis engine

FIG. 2: A high-level architecture of an example of the invention

FIG. 3: Function of the vulnerability assessment tools

FIG. 4: High-level description of the AI/ML historical & consensus analysis system FIG. 5: Function of the invention for mitigation management of vulnerabilities FIG. 6: Function of the invention for analyzing and testing IoT devices

DETAILED DESCRIPTION OF DRAWINGS

Terminology

AI: Artificial intelligence. A mechanism that mimics human problem solving and decision making.

API: Application programming interface. A mechanism allowing for two or more programs to communicate.

CBM: Condition-based monitoring. Continuous development of maintenance processes and procedures that improve capabilities, practices, and technologies.

CI/CD: Continuous improvement/continuous development/delivery. It is a way of creating software in smaller, more continuous increments, instead of the more traditional way of developing software by introducing many changes in larger patches.

CPE: Common platform enumeration. A way of classifying devices, operating systems, and applications with known CVEs.

CVE: Common vulnerabilities and exposures. A publicly disclosed computer security flaw, such as in a commonly used software package or library.

CWE: Common weakness enumeration. A system for categorizing hardware and software weaknesses.

DCS: Distributed control system. A system of sensors, controllers, and other components over a plant or control area.

DevSecOps: Development, security, and operations. It focuses on automation and security throughout the development lifecycle.

EO: Executive order. A law issued by the president to an executive branch of the government.

gRPC: g remote procedure calls. A cross platform open-source RPC framework.

HMI: Human machine interface. A user interface that allows a human to interact with a controller, such as a device or system.

ICS: Industrial control system. A system used to control industrial processes that encompasses several types of control systems, such as SCADA systems and distributed control systems.

IoT: Internet of Things, a phrase used to describe network-enabled smart devices that both enhance functionality of everyday items, but also provide a much larger attack surface for hackers to breach into a network. For example, smart refrigerators, thermostats, and TVs.

Machine Learning (ML): A mechanism that allows computers to improve algorithmic accuracy through experience and the usage of data.

MITRE: A corporation that manages federally funded research and development centers that support U.S. government agencies and maintain one of the main CWE and CVE databases.

NIST: National Institute of Standards and Technology at the U.S. Department of Commerce. NIST creates cybersecurity frameworks to promote industry standards to reduce cybersecurity risks.

NLP: Natural language processing. Artificial intelligence and machine learning for text and spoken words.

NVD: National vulnerability database. A database maintained by NIST containing known vulnerabilities allowing for easier automation of vulnerability analysis and management and compliance.

OpenAPI: A standard for documenting and creating a knowledge base for APIs that defines the input, output, authentication, parameters, and syntax for API endpoints.

OT: Operational technology. Hardware/software used to monitor changes by monitoring industrial equipment, devices, processes, and infrastructure.

OT/ICS: Operational technology/industrial control systems. In this patent, OT/ICS may include any type of embedded device.

REST: Representational state transfer. A software architecture style designed to allow for designating states of media across the internet.

RESTful: Software or applications that follow the design considerations & constraints of REST.

RMF: Risk management framework. Includes NIST, ISO, etc., standards, guidelines, and processes to secure information systems.

RPC: Remote procedure calls. A way for computers to execute procedures/subroutines on other systems.

RTU: Remote terminal units. A system with radio interfacing used to communicate with remote field equipment.

SCADA: Supervisory control and data acquisition. An industrial control system combining software and hardware elements allowing organizations to monitor real-time data, control industrial processes, and directly interact with devices.

SDK: Software development toolkit. A prebuilt collection of software tools enabling developers to build applications for specific platforms.

Example of the Compliance Analysis Engine

FIG. 1 depicts a high-level flowchart of an example of a compliance analysis engine in the exemplary context of OT/ICS (but is not limited to OT/ICS, and applies to IT and computing systems in general). In this example, the compliance analysis engine may receive (but is not limited to) information and/or metadata about an OT/ICS device, such as for example device name, device version, manufacturer, date, etc., firmware, binaries, logs, and/or vulnerability assessment results. It may discover vulnerabilities in the device's binary/binaries. It may generate compliance mappings for vulnerabilities, prioritize the most critical vulnerabilities/compliance issues, determine mitigation steps for the compliance issues and/or discovered vulnerabilities, and/or report results to end users of the compliance analysis engine, etc. Steps in this flowchart may be removed, added, and/or modified, etc., and new steps may be added at any step in the process. The compliance analysis engine may be used to analyze and/or map (e.g., to controls) for example but not limited to binary analysis, network analysis, firewall traffic analysis, configurations, and/or source code analysis results, etc. It may include results from a single type of vulnerability assessment tool, or results from multiple types of vulnerability assessment tools. It may include results from a single tool under a type of vulnerability assessment or multiple. It may include no vulnerability assessment results, and vulnerability analysis may be performed by the compliance analysis engine. The example described illustrates using the compliance analysis engine for binary analysis (but is not limited to binary analysis), wherein binary analysis may be performed by the compliance analysis engine or separately by a user, tool, and/or script, etc. As described above, the described compliance analysis engine is not limited to OT/ICS or binary analysis.

OT/ICS Device

An OT/ICS Device 105 may be zero or more devices that the compliance analysis engine may performs its analysis on. A device may have its binary/binaries extracted and analyzed 110 in this example of the compliance analysis engine. Extraction and/or analysis may be performed by a user and/or external to the compliance analysis engine. Results of external extraction and/or analysis may be received by the compliance analysis engine.

Extract & Analyze Binary

An Extract & Analyze Binary 110 step may be a function that may gather data from an OT/ICS Device 105 and/or may extract the binary from the device through various ways. This binary may be analyzed, by human and/or through automated means, using firmware analysis, binary analysis, and/or vulnerability detection tools, etc. Once the binary is analyzed for potential vulnerabilities, list(s) of vulnerabilities may be generated into a report, and/or sent to a Generate Vulnerability Compliance Mappings 115 step for further analysis.

Generate Vulnerability Compliance Mappings

A Generate Vulnerability Compliance Mappings 115 step may be a function that may take a list of known vulnerabilities from a computer binary or binaries and/or may determine potential compliance mappings for zero or more devices. Compliance mappings may include well known frameworks, including for example but not limited to NIST, IEC/ISA, ISO and/or COBIT, etc. A compliance mapping mechanism may take the known vulnerabilities and determine if there are any known vulnerability mappings, and/or determine potential mappings through consensus and/or historical analysis of compliance frameworks and/or usage of a vulnerability. These mappings of known vulnerabilities to compliance controls may be received by a Determine Most Important Vulnerabilities & Compliance Issues 120 step for further analysis.

Determine Most Important Vulnerabilities & Compliance Issues

A Determine Most Important Vulnerabilities & Compliance Issues 120 step may be a function where the compliance analysis engine may take in a list of vulnerability to compliance control mappings and/or may determine what vulnerabilities and/or compliance issues may cause (for example a large amount of) damage or cause severe security threats to an organization. The compliance analysis engine may perform this task in a number of ways, including (but not limited to) through the usage of AI systems that analyze different types of data. This data used for the AI system may include data such as for example historical data that shows for example the number of known public attacks utilizing certain vulnerabilities and/or compliance issues, historical data showing the prevalence of a certain vulnerability/compliance issue, and/or other historical data that may lead to knowledge of a likelihood of an attack. The AI system may use other types of data, including for example consensus data from cybersecurity practitioners of what vulnerabilities could be more or less harmful, consensus data from previous analysis from the compliance analysis engine and/or feedback from previous users of the compliance analysis engine, or from any other mechanisms that may provide data for the criticality of a vulnerability and/or compliance issue, etc. This list of most harmful compliance issues and/or vulnerabilities may be passed to be reported directly to the end users 130 for review. All of the compliance mappings, including the most important and not as important, may be passed to a Determine Mitigation for Compliance Issues 125 step to determine potential ways for mitigation of these issues. Consensus analysis may include (but is not limited to) analyzing analysis results across multiple organizations, devices, and/or vulnerability assessment tools, etc. It may result in analysis of how likely a vulnerability exists by determining how often it appears for an OT/ICS device across organizations, devices, and/or vulnerability assessment tools, etc. It may result in analysis of the quality, accuracy, and confidence of results of one or more vulnerability assessment tools. It may result in improved compliance framework mappings and/or enhancement to a tool's results based on more detailed and/or accurate results from other tool(s).

Determine Mitigation for Compliance Issues

A Determine Mitigation for Compliance Issues 125 step may be a function where the compliance analysis engine may determine potential mitigations for known compliance issues and/or vulnerabilities found in zero or more OT/ICS device binary. The function may take compliance and vulnerability mappings, as well as the most severe vulnerabilities/compliance issues and generates potential mitigations. These mitigations may include changes that could for example be introduced to a computer binary, potential additions to the hardware/software, or other protections such as adding external devices, and/or ensuring data is handled using certain protocols, etc. These mitigations may then be reported in the Report to End Users 130 step.

Report to End Users

A Report to End Users 130 step may include reporting findings from the compliance analysis engine to users of the compliance analysis engine. These users, may for example include individuals in organizations, or whole organizations, e.g., the manufacturer of the OT/ICS device, a vendor using/selling the device, or any other organization that may have a stake in the security of a device (e.g., security researching companies, compliance auditing firms, etc.), etc.

Example: Compliance Analysis Engine Applied to Binary Analysis

FIG. 2 depicts an example of the compliance analysis engine as it may be applied to binary analysis and OT/ICS devices (but the invention is not limited to binary analysis and OT/ICS devices but applies analogously to other analyses and computing devices). The diagram describes an overall architecture of the system, including functional input/output (I/O) pairs, and what systems and/or stakeholders it may affect. Modules illustrated in this example may be removed, added, and/or modified, etc., and new modules may be added to the architecture.

OT/ICS Device

An OT/ICS Device 205 may be used as the main input for the compliance analysis engine. In this example, it may be analyzed separately from the compliance analysis engine. It may be analyzed internally through a suite of Vulnerability Assessment Tools 210. Any aspect of an OT/ICS device may be analyzed by assessment tools, including for example (but not limited to) binary analysis, network analysis, firewall analysis, source code analysis, etc. As input, it may be received by the Vulnerability Assessment Tools 210 for analysis. As output, it may be modified by Third Party Organizations 235, Manufacturers and Vendors 240, and/or the Mitigation Manager 230. Depending on application, this may include but is not limited to the physical device on its own, or for example a binary, meta data, and/or other data associated with the device for analysis.

The OT/ICS device may take several forms, including OT/ICS devices where the device may be embedded in OT/ICS equipment, and/or non-OT/ICS equipment, such as IT devices such as (but not limited to) routers, modems, switches, networking devices, and/or cameras, etc., and/or other embedded systems, such as car computer systems, and/or any other computing system.

Vulnerability Assessment Tools

Vulnerability Assessment Tools 210 may be (e.g., a suite of) vulnerability assessments, and/or automated tools to run these assessments. It may be internally within the compliance analysis engine and/or run separately (and/or at different times). The results of external assessment tools may be received by an API Compliance Integration 215 module. It may be used to generate analysis and/or find potential and/or confirmed vulnerabilities in OT/ICS devices. It may provide analyses to an API Compliance Integration 215 module for further usage. The module may perform this analysis with a variety of specialized tools for binary analysis, e.g., Ghidra, ObjectSecurity OT.AI Platform, IDA, Binary Ninja, and/or Binary Analysis Platform (BAP), etc. This module is further illustrated in FIG. 3.

Vulnerability Assessment Tools 210 may perform many different types of analyses, including but not limited to static and dynamic analysis approaches (e.g., using tools like Ghidra, IDA, ollydbg, etc.), network performance analysis (e.g., using tools like Wireshark, nmap, etc.), advanced binary analysis tools (e.g., like OT.AI Platform), and/or automated tools (e.g., Zed Attack Proxy), etc.

API Compliance Integration

An API Compliance Integration 215 module may integrate between the Vulnerability Assessment Tools 210, Compliance Issues Database 220, and/or the AI/ML Historical & Consensus Analysis 225 module. This integration system may use open standards such as API to connect and integrate the tools together.

An API Compliance Integration 215 module may be implemented in many different ways, including for example through known API specifications (e.g., OpenAPI, RESTful, and/or gRPC, etc.), written on many different types of devices (e.g., web servers such as NodeJS, Flask, Django, Java applications, etc., and/or other services/servers such as AWS API gateway, etc.)

Compliance Issues Database

A Compliance Issues Database 220 module may be a data store (e.g., a secure database) that contains information related to controls for compliance purposes of OT/ICS binaries and devices. These controls may be aggregated from previous results, results from other tools, and/or other results mapping controls to compliance requirements. This database may track updates for a given device and/or device's software, as well as known vulnerabilities and/or mitigations for said vulnerabilities. These vulnerabilities may be accessed in the compliance analysis engine via the API Compliance Integration 215 module and/or may be used by the AI/ML Historical & Consensus Analysis 225 module.

The compliance issues database may exist in many different forms, including database software such as PostgreSQL, MySQL, Microsoft SQL, and/or SQLite living on a Flask application, etc., and/or offline database files or directories living on a device, and/or any other technique for storing data. The controls may for example include but are not limited to techniques for storing data, transferring data, what should/should not be encrypted, if certain functions should/should not be used, and/or imported library versions, etc.

AI/ML Historical and Consensus Analysis

An AEML Historical & Consensus Analysis 225 module may be an analysis system that may take known vulnerabilities and a computer binary, as well as known compliance issues and mappings for said vulnerabilities, and/or performs analyses, etc. This analysis may include scoring the likelihood of an attack occurring from said compliance deficiency/vulnerability, the severity of a vulnerability/compliance issue, and/or discovering new mappings based on historical data. After creating these mappings, it may give the most important compliance issues and vulnerabilities to Third Party Organizations 235, and/or may send all compliance mappings, discovered compliance mappings, and/or other data to the Mitigation Manager 230 for mapping deficiencies to mitigations. This module is illustrated in more detail in FIG. 4.

An AEML Historical & Consensus Analysis 225 module may perform its tasks in several ways, including checking historical data for previous attacks using a given vulnerability or set of vulnerabilities, checking historical data for previous known mapping of compliance data to vulnerabilities, known previous instances of compliance deficiencies, consensus data from experts in the area of compliance around OT/ICS devices, and/or consensus data from previous feedback from previous users of the compliance analysis engine, etc.

Mitigation Manager

A Mitigation Manager 230 may be a module that may receive vulnerabilities and compliance deficiencies for a device (for example from the AEML Historical & Consensus Analysis 225 module), and that may map the compliance deficiencies to mitigation recommendations to send to Manufacturers and Vendors 240 of a product, as well as Third Party Organizations 235 using these devices. This module is illustrated in more detail in FIG. 4.

A Mitigation Manager 230 may work using several different mechanisms, including, but not limited to, mapping compliance issues and vulnerabilities to known mitigation approaches, ranking the difficulty and challenge of each mitigation, and/or using a ranking system to determine which mitigations should be implemented first, etc.

Third Party Organizations

Third Party Organizations 235 includes, but is not limited to, other organizations that utilize OT/ICS devices 205 for their own organization needs, enforce compliance standards pertinent to OT/ICS systems, and/or in general advise organizations on mitigations for vulnerabilities to lower likelihoods of attack, etc. They may provide feedback to the compliance analysis system for further analysis. They may be a potential user of the compliance analysis engine, and/or would be sent the device's vulnerabilities, compliance issues, and mappings from a Mitigation Manager 230 and an AI/ML Historical & Consensus Analysis 225 module.

Third Party Organizations 235 may include organizations such as (but not limited to) compliance auditing firms, compliance organizations or governmental bodies, organizations that maintain databases of cybersecurity threats, CVEs, CWEs, and/or any other type of data related to cybersecurity, etc.

Manufacturers and Vendors

Manufacturers and Vendors 240 includes organizations responsible for example for designing, engineering, and/or utilizing a given OT/ICS device 205, etc. They may be given the results of a Mitigation Manager 230 and/or AI/ML Historical & Consensus Analysis 225 module.

Example: Vulnerability Assessment Tools Applied to Binary Analysis

FIG. 3 depicts an example of the vulnerability assessment tools applied to binary analysis. This module may be either automated, semi-automated, and/or manual, depending on the use case and implementation. As an automated and/or semi-automated system, an automated testing system may lift device information and any binaries for an OT/ICS device and test the module using vulnerability analysis tools. If manual, a user may use these tools to perform their own analysis. This module may generate assessed vulnerabilities, which can be used for further analysis. Modules presented in this example may be removed, added, and/or modified, etc., and new modules may be added to the architecture, and the invention is not limited to binary analysis and OT/ICS devices but applies analogously other analyses and computing devices.

OT/ICS Device

An OT/ICS Device 305 may be a computing device that may constitute an input for the compliance analysis system and/or may be the main device from where device information and the devices' binary are extracted.

An OT/ICS Device 305 may for example include devices such as for example sensors, actuators and instruments (e.g., pressure, temperature, flow rate, level, etc. sensors), SCADA, HMI, and/or other human usable instruments with complex embedded binaries on them, computer systems connecting other OT/ICS embedded devices (e.g., routers, switches, modems, and/or networking devices, etc.), and/or any other device that may have embedded controllers, etc.

Extract Device Binary

An Extract Device Binary 310 module may be a function that may take an OT/ICS Device 305 and/or extracts a devices' computer binary or binaries. This extract may occur in a number of different ways, including for example physical means such as reading the binaries from a physical chip, and/or by downloading the device's binaries from a trusted vendor website, etc. The binaries may be directly provided, in which case this step may be skipped.

This module may work in several different ways, including approaches such as binary extraction via for example JTAG, USB, Ethernet, and/or other hardware debugging interface where a binary may be flashed or extracted, pulled from the manufacturer's directory or online source of binaries, and/or given directly by the end user of the compliance analysis engine, etc.

Automated Testing System/Human Tester

An Automated Testing System/Human Tester 315 module may be a system that may receive a lifted binary from an Extract Device Binary 310 module, and/or may use the binary, along with Device Information 330 to test an OT/ICS Device 305 for vulnerabilities. An Automated Testing System/Human Tester 315 module may interact with the Vulnerability Analysis Tools 320 to manually test the binaries of the OT/ICS Device 305 with the Vulnerability Analysis Tools 320 and may create a list of discovered vulnerabilities. If the testing system is semi-automatic, a human-in-the-loop may interact with the automated testing system, to oversee and approve of any vulnerabilities discovered by the system, to ensure accuracy.

Vulnerability Analysis Tools

Vulnerability Analysis Tools 320 may be (e.g., a set of) tools that may be used to analyze computer binaries and/or detect vulnerabilities of varying severity. These may include tools such as for example (but not limited to) reverse engineering tools, weak pointer analysis tools, entropy and encryption analysis tools, and/or CWE/CVE analysis tools, etc. These tools may be used by the Automated Testing System/Human Tester 315 module on data from the Extract Device Binary 310 module and/or Device Information 330 to generate a report of the Assessed Vulnerabilities 335.

Vulnerability Analysis Tools 320 may take many forms, including reversing tools (such as Ghidra, IDA, ollydbg etc.), network performance analysis (for example using tools like Wireshark, nmap, etc.), advanced binary analysis tools (like OT.AI Platform), and/or automated tools (e.g., Zed Attack Proxy), etc.

Extract Device Info

An Extract Device Info Module 325 may be a function that receives an OT/ICS Device 305 and/or data and/or obtains information about the device. This data may be numerous, and may include for example (but not limited to) identification data such as model, SKU, and/or technical data, such as binary version, design date, and/or specifications, etc. This data may be lifted and/or used in Vulnerability Analysis Tools 320 to generate analyses on an OT/ICS Device 305.

Device information may be extracted in many different ways, including for example but not limited to checking for metadata on the device's binaries, checking online for data sheets, accessing datasheets provided by the manufacturer and/or end user of the compliance analysis engine, etc.

Assessed Vulnerabilities

Assessed Vulnerabilities 335 may be any vulnerabilities that may have been discovered through Vulnerability Analysis Tools 320 functionality. It may be given from the testing tools and/or may describe various information about the discovered vulnerabilities. This may for example include locations in a binary of a vulnerability, and/or the type of vulnerability, etc. These vulnerabilities may be used in other segments of the compliance analysis engine.

Assessed Vulnerabilities 335 may include vulnerabilities such as for example (but not limited to) CVEs, CWEs, zero-day vulnerabilities that are currently unknown, pointer-based vulnerabilities, and/or state-based vulnerabilities, etc.

Function of the Invention: AI/ML Historical & Consensus Analysis

FIG. 4 describes an example of an AI/ML historical & consensus analysis module. An AI/ML historical & consensus module may be designed to create an intelligent mapping of compliance issues to vulnerabilities, as well as assess the potential for utilization of said vulnerabilities. The AI/ML historical & consensus analysis module may be constructed in a number of ways, and/or not require all modules illustrated in the figure. An output of this module may be a list of known, urgent vulnerabilities that may cause significant harm and/or damage. These may be defined for example by historical data and/or AI analyze data trends, and/or mapping of all discovered vulnerabilities to potential for utilization in a cyber-attack and/or to compliance standards to which they are related. Modules illustrated in this example may be removed, added, and/or modified, etc., and new modules may be added to the architecture, and the invention is not limited to binary analysis and OT/ICS devices but applies analogously other analyses and computing devices.

OT/ICS Device Binary

An OT/ICS Device Binary 405 may be a computer binary for example from an OT/ICS device. This binary may be one or multiple binaries that were pulled from an OT/ICS device. The binary may be used as input to Historical Data Trend Detection AI 415 and/or Compliance Mapping AI 420 modules.

Assessed Potential Vulnerabilities

Assessed Potential Vulnerabilities 410 may be (some or all) discovered vulnerabilities associated with the given OT/ICS Device Binary 405. This may be used as input to Historical Data Trend Detection AI 415 and/or Compliance Mapping AI 420 modules.

The vulnerabilities assessed may include vulnerabilities such as for example CVEs, CWEs, zero-day vulnerabilities that are currently unknown, pointer-based vulnerabilities, and/or state-based vulnerabilities, etc.

Historical Data Trend Detection AI

A Historical Data Trend Detection AI 415 may be an AI function that may receive in an OT/ICS Device Binary 405 and/or Assessed Potential Vulnerabilities 410 from the binary and/or previous historical data from the Historical Compliance Database 425 to generate vulnerability compliance mappings based on historical data. This data may include many different types of data, such as (but not limited to) previous vulnerabilities being found in certain binaries, binaries written by certain vendors, previously known attacks on OT/ICS devices, and/or any other types of data, etc. This may include data from user feedback to help retrain the AI model for better results. This data may be used to train and test an AI model that can make advanced decisions on potential vulnerabilities found inside of an OT/ICS Device Binary 405. The AI may return the output of all potential mappings, potentially with confidence scores and/or other data pertaining to the mappings, and/or outputs this data to a Vulnerability Utilization Estimator 435.

Compliance Mapping AI

A Compliance Mapping AI 420 module may be a function, that may be an AI function, that may take in an OT/ICS Device Binary 405 and/or Assessed Potential Vulnerabilities 410 from the binary, and/or data from the Compliance Issues Database 430 to generate vulnerability compliance mappings based on known mappings between vulnerabilities of semantic similarity to compliance standards. This data may include for example various compliance standards (e.g., ISA/IEC, NIST, etc.), CWEs, CVEs, and/or other compliance standards that relate to OT/ICS security. An AI model, through various potential AI types and/or techniques (e.g., decision trees, neural networks, machine learning, clustering, and/or rule-based, etc.), may use this data and the inputted binary and vulnerabilities to map vulnerabilities to compliance standards, which may be used to estimate the potential for compliance issues and severity of the vulnerabilities by a Vulnerability Utilization Estimator 435.

Historical Compliance Database

An Historical Compliance Database 425 module may be a data store that may contain various historical data for training Historical Data Trend Detection AI 415. This historical database may contain data from previous compliance mappings, including for example but not limited to vendor information, manufacturer information, compliance issues, potential mitigations, and/or other data from previous interactions with the compliance analysis engine, etc. This data may be used to analyze the current OT/ICS Device Binary 405.

Compliance Issues Database

A Compliance Issues Database 430 module may be a data store of known vulnerability to compliance issues mappings. This data may contain various semantic representations of vulnerabilities, such as CVEs, CWEs, and/or other known vulnerabilities, etc. It may maps vulnerabilities to compliance frameworks (e.g., IEC, ISA, and/or NIST, etc.). This database may be used by a Compliance Mapping AI 420 module for training and/or querying for potential issues in an OT/ICS Device Binary 405.

Vulnerability Utilization Estimator

A Vulnerability Utilization Estimator 435 module may be a function that may receive vulnerabilities with compliance mappings data, historical data about related vulnerabilities and/or estimates the likelihood that a vulnerability could be used in an attack, etc. The estimator may for example use statistical approaches to analyze the likelihood that an attack may occur, and/or how susceptible a particular binary is to an attack given certain vulnerabilities, and/or any other combination of pertinent information that outlines the most Urgent Vulnerabilities 445 to be patched. The estimator may receive User Feedback 440 from users and/or other outside sources to train the estimator for greater accuracy. The estimator may output a list of Urgent Vulnerabilities 445 and/or an overall list of Vulnerabilities to Utilization and Compliance Mappings 450, which may be used on its own and/or received by other parts of the compliance analysis engine.

User Feedback

A User Feedback 440 module may be user feedback from the end users and/or other external sources to improve the accuracy of the Vulnerability Utilization Estimator 435. This feedback may for example come in the form of survey data, and/or external news sources about attacks against certain CVEs/CWEs, etc.

Urgent Vulnerabilities

An Urgent Vulnerabilities 445 module may be a set of vulnerabilities discovered in the OT/ICS Device Binary 405 that may be capable of allowing potential attacks and/or compliance issues for the given OT/ICS device. This list may have vulnerabilities that are urgent and need immediate patching on their own, or in combination with one another. The ranking of what may be an urgent and/or non-urgent may be determined by the Vulnerability Utilization Estimator 435.

Vulnerability to Utilization and Compliance Mapping

A Vulnerabilities to Utilization and Compliance Mappings 450 may be a mapping of the known vulnerabilities from an OT/ICS Device Binary 405 to known compliance frameworks, as well as estimated likelihood of utilization and/or level of severity, as estimated by a Vulnerability Utilization Estimator 435.

Function of the Invention: Mitigation Management

FIG. 5 depicts an example of the internal function of the mitigation management of vulnerabilities system. This function may be designed to take in a set of vulnerabilities, their compliance issues mapping and/or utilization mapping and/or determines a set of mitigations that may be taken by vendors and/or third party organizations to reduce/remove compliance issues and help secure the device. Modules illustrated in this example may be removed, added, and/or modified, etc., and new modules may be added to the architecture, and the invention is not limited to binary analysis and OT/ICS devices but applies analogously other analyses and computing devices.

Urgent Vulnerabilities

An Urgent Vulnerabilities 505 module may be a list of vulnerabilities that, either on their own or in combination with one another, may make the given OT/ICS device particularly susceptible to attack, and/or severely out of compliance with a given compliance framework etc. These vulnerabilities may be provided to a Mitigation Difficulty Scorer 515 module for detection of mitigations. This module may be separated from the Vulnerability to Utilization and Compliance Mapping 510 module to emphasize for example but not limited to vendors, manufacturers, and/or third party organizations that these vulnerabilities may be particularly important to patch and/or require significant attention.

Vulnerability to Utilization and Compliance Mapping

A Vulnerability to Utilization and Compliance Mapping 510 module may be a list of vulnerabilities and their mapping to compliance issues in a given compliance framework or set of compliance frameworks, and/or potential techniques and/or likelihoods for utilization by an adversarial threat etc. These vulnerabilities and compliance mappings may be received by a Mitigation Difficulty Scorer 515 module for scoring on potential mitigations.

Mitigation Difficulty Scorer

A Mitigation Difficulty Scorer 515 module may be a scoring mechanism that takes in a list from a Vulnerability to Utilization and Compliance Mapping 510 module and/or a list from an Urgent Vulnerabilities 505 module. It may determine the difficulty of implementing a mitigation for each vulnerability. The module may use a diverse set of potential approaches, including AI techniques such as decision trees, neural networks, machine learning, clustering, and/or rule-based, etc., and/or may determine how difficult mitigation for each vulnerability may be. It may accomplish this for example by looking at vulnerability complexity, how many instances of a vulnerability exists, and/or known mitigations from a Mitigation Database 525, etc. It may provide these difficulty scores to the Mitigation Recommendations 520 module to generate recommendations for external users.

Mitigation Recommendations

A Mitigation Recommendations 520 module may be a function that takes in a set of vulnerabilities, compliance mappings, and/or difficulty of potential mitigation for each vulnerability, and/or generates a list of recommendations on mitigating damage caused by the known compliance issues, etc. This generated list may be provided to Vendors and Manufacturers 530 and/or Third Party Organizations 535 for implementation. A Mitigation Recommendations 520 module may use various techniques, such as taking the known difficulty of the mitigation and/or estimating the likelihood of resolution, the complexity of the vulnerability, the complexity of a certain mitigation, and/or the number of potential resolutions, and/or generates a list of potential mitigations etc. It may use a Mitigation Database 525 to generate known lists of mitigations for certain compliance issues and/or vulnerabilities. In particular, the recommendation system may prioritize urgent vulnerabilities that could have significant compliance and/or security issues for the users of the OT/ICS device.

Mitigation Database

A Mitigation Database 525 module may be a data store that contains different types of mitigations, and their mappings to known vulnerabilities for OT/ICS devices. This database may be used by a Mitigation Difficulty Scorer 515 module and Mitigation Recommendations 520 module to query for mappings of mitigations for these vulnerabilities. It may include other information, such as the difficulty of implementing a mitigation, known pitfalls for implementation of a mitigation, and/or other auxiliary information that may help a user of an OT/ICS device to meet compliance and cybersecurity standards, etc.

Vendors/Manufacturers

Vendors and Manufacturers 530 may be for example organizations responsible for designing, engineering, and/or utilizing etc. an OT/ICS device being assessed by the compliance analysis engine. They may be given the results of the Mitigation Recommendations 520 module for potential implementation of the known vulnerabilities and mitigations.

Third Party Organizations

Third Party Organizations 535 may be other organizations that utilize OT/ICS devices for their own organization needs, enforce compliance standards pertinent to OT/ICS systems, and/or in general advise organizations on mitigations for vulnerabilities to lower likelihoods of attack and/or provide feedback to the compliance analysis engine for further analysis etc. They may be provided the recommended mitigations of the OT/ICS device's binary/binaries from a Mitigation Recommendations 520 module.

Function of the Invention: Analyzing and Testing IoT Devices

FIG. 6 depicts an example of the compliance analysis engine, wherein it may be used to (but is not limited to) instrument, analyze, test, map, and/or mitigate device(s). It may instrument IoT components/systems using instrumentation at the binary, network, and/or source code levels, automated and/or human-in-the-loop test generation, supporting many different communication protocols (including those specific to IoT and serial connection), real-time management and/or analysis of IoT components and/or systems, automated readiness and/or resilience testing, continuous monitoring, testing, and/or holistic analysis of full IoT systems, etc. While this example is presented in the context of IoT, it is not limited to IoT, i.e., it applies analogously to other computing systems. Furthermore, not all components of the depicted example may be present, and steps may be reordered, removed, or added.

For example, it may provide users with ways to instrument IoT devices to collect, log, and/or provide data to the compliance analysis engine. It may include a suite of tests that may be used to assess IoT devices and/or ensure they are operating as intended. Data collected through instrumentation may be provided through interfaces and/or protocols, such as but not limited to, a CI/CD pipeline, CLI, integration with version control software, Wi-Fi, Ethernet, 4G, 5G, Bluetooth, Zigbee, and/or serial connection, etc. It may be used (but is not limited to) during development, prior to deployment, and/or during deployment, etc. It may be connected to binary analysis, wherein binaries may be extracted from device(s) and/or used as input for binary analysis. It may be used to ensure resiliency of IoT devices. Analysis results of IoT testing may be used to ensure devices are compliant with frameworks. Modules illustrated in this example may be removed, added, and/or modified, etc., and new modules may be added to the architecture, and the invention is not limited to binary analysis and IoT devices but applies analogously other analyses and computing devices. In this example, testing is used to assess resilience and/or readiness of a system. In other examples, it may be used for prevention of vulnerabilities, and/or response to attacks, etc.

IoT Devices and Instrumentations

IoT Devices 605, for example, may include sensors (e.g., temperature, motion, smoke, humidity, chemical, pressure, proximity, and/or air quality sensors, etc.), controllers (e.g., microcontrollers, microchips, and/or semiconductors, etc.), communication devices, microcomputers (e.g., system on a chip video cards, RAM, and/or I/O ports, etc.), and/or commercial devices (e.g., voice controllers, doorbell cameras, smart light switches, and/or smoke alarms, etc.). Device(s) may be in a laboratory, in a lab, and/or outside, etc. These devices may be tested at any phase in the IoT system lifecycle. Instrumentations 610 may be method(s) used to instrument code on a device to collect data. This data may include, but is not limited to, security data, data regarding the state of the device, metadata, and/or logs, etc. It may instrument over network communications, such as (but not limited to) over Wi-Fi and/or Bluetooth, etc. It may instrument code through an SDK that may be provided by the compliance analysis engine. For example, a firmware and/or software developer can instrument their code using the SDK during development. It may instrument code through binary instrumentation, wherein the compliance analysis engine may modify the binary to collect data, such as through binary patching. Binary instrumentation may be useful in instances where the developer of the source code is not available and/or the source code cannot be rebuilt and/or is not available. Instrumentation may provide access to the running state of an IoT device 605. Data collected through instrumentation may be provided through Interfaces and/or Protocols 615, such as but not limited to, a CI/CD pipeline, CLI, integration with version control software, Wi-Fi, Ethernet, 4G, 5G, Bluetooth, Zigbee, and/or serial connection, etc. Serial connection, for example, may provide debugging, running state, and instrumentation data that may not be available through network communications.

Testbed

A Testbed 620 may receive data from IoT device(s) and may act as the connection point to a Controller 625. It may interact with IoT device(s) through one or more Interfaces and/or Protocols 615. It may be hosted, for example, on-premises and/or in the cloud. Tests, such as automated tests, that the controller wants to send to IoT devices may be sent through the testbed and/or back to the devices to execute the tests.

Controller

A Controller 625 may be inside and/or outside the compliance analysis engine. It may act as a bridge between a Testbed 620, User Interface 645, and/or other modules for testing, analyzing, mapping, and/or mitigating devices and/or their data. A Controller 625 may contain APIs, such as, but not limited to, for interacting with other modules, configuring tests, configuring instrumentation, and/or configuring commands, etc. It may contain an Instrumentation API 630, a Command API 635, and/or a Test API 640, etc.

An Instrumentation API 630 may collect analytics and/or device state that the device instrumentation may send back. It may interface with instrumentation(s) and/or may be configured. It may support many types of instrumentation and/or may obtain device information. It may have support for developers to send logs and/or wrap code functions to send information for analysis to a Test Runner 665.

A Command API 635 may send commands for interacting with the instrumentation and/or may be configurable. It may contain and/or organize messages that IoT devices may respond to. It may utilize commands that are published by the vendor of an IoT Device 605. A Command API may include universal operations. Users may test an IoT Device 605 for resilience and/or for readiness by sending commands and/or analyzing responses through this API. For example, a user may test if it is possible and/or how easy it is to run a reset on a device. The command API may send messages to each device, such as powering the device on or off and/or changing the configuration state.

A Test API may be an interface for a Test Runner 665 that may allow a user to create and/or push tests. It may be responsible for receiving input from a user on a User Interface 645 to send to a Test Runner 665. It may be integrated into a low-code or no-code development platform for creating automated customized tests written using high-level building blocks for AI/ML, published operations, and/or rules-based components for IoT Device(s) 605.

User Interface

A User Interface 645 may provide users with a mechanism to interact with a Controller 625 and/or its API endpoints. It may be used advanced analytics capabilities, such as to quickly obtain feedback, test results, and/or vulnerability and/or patching information for connected devices in real-time, etc. End-users may view feedback from the system on the resilience and/or reliability. It may expand to enterprise operations, such as for future long-term usefulness and/or maintenance, e.g., team management, facilities, and/or organizations, etc. It may be a human machine interface for administrating the devices and/or handling permission access. Users may be able to view a map of the device network, device information such as storage, battery, logs, and/or history, and/or other information, such as the serial number, manufacturer, and/or firmware and hardware versions and/or identifiers (MAC, etc.) of the IoT device, etc. There may be an option to organize devices based on location and/or an option to map out the locations of devices on a map of the deployment site.

A User Interface 645 may be a pipeline, which may include (but is not limited to) a CI/CD, DevSecOps, DevOps, and/or other type of pipeline. It may be an AIOps and/or MLOps pipeline if an IoT Device 605 is training and/or utilizing AI/ML. It may coordinate and/or choreograph test and store reports based on the testing results. It may integrate Controller 625 APIs with a development and/or deployment pipeline. It may be integrated into a software development lifecycle, wherein a software developer may update source code and may want to receive immediate feedback on the resilience and/or readiness of the device. In this example, the user may use this pipeline to push code changes and/or get feedback while coding. It may be used by a user who is doing field testing using a pipeline in a lab or in the field. A user may run tests every time a pipeline is executed and/or may collect results. It may be used for generating supporting evidence, audits, tracking progress, detecting vulnerabilities, generating compliance mappings, and/or receiving feedback to improve resilience and/or readiness.

Vulnerability Analysis Tools

Vulnerability Analysis Tools 650 may be used to analyze the firmware and/or binaries of IoT Device(s) 605. It may include, for example, analyses for vulnerabilities, weaknesses, and/or malware. They may be analyses hosted internally in the compliance analysis engine and/or interact with external analyses. Analyses may interact with the controller and/or assess firmware upgrades before they are released.

Condition-Based Monitoring (CBM)

CBM+ 655 (or any other maintenance system, incl. condition-based, predictive etc.) may be used to improve the reliability and/or maintenance of IoT Device(s) 605. It may monitor the condition of device(s) and/or decide maintenance that should be performed. It may utilize compliance frameworks to make decisions. Users may be able to set conditions from a Test API 640, such as (but not limited to) if the temperature or RPMs (rotations per minute) go above or below a specific value, and/or use AI/ML over time to analyze deviations from normal expected behavior.

For example, a controller and sensor may be working together to maintain a process and/or equipment at a certain temperature. Conditions may be set in this module, and if a temperature is exceeded, an alert would be sent to end-users.

It may integrate with multiple sensors and/or from multiple different networks, and/or users may configure complex conditions involving multiple networks. A Testbed 620 may be turned off to create a standalone CBM+ system for IoT devices wherein the controller may be configured to directly output results to the API. This may allow for automated and/or continuous condition-based monitoring of IoT devices, where users can set baselines and be notified when measurements deviate from what is expected.

Compliance Mapping API

A Compliance Mapping API 660 may interact with a Controller 625. It may provide information on compliance frameworks for tests, analyses, CBM+ 655, and/or other mechanisms within a Controller 625 and/or mechanisms that integrate with it, etc. A Compliance Mapping API 660 may interact with other analyses and components described in other functions of the invention, such as for historical and consensus analysis. It may map results from testing with compliance frameworks.

Compliance Mapping API

A Test Runner 665 may manage built-in tests, automated tests, and/or tests sent through a Test API 640, etc. It may track and/or store incoming data. It may calculate and/or track results for reporting. It may be a manual, semi-automated, and/or automated mechanism. It may include a rules-based AI/ML approach and/or testing templates to automatically generate tests to push out to IoT Devices 605. It may collect results and/or store them for reporting purposes.

It may contain an AI/ML message generator, which may take samples of messages that are used to control the IoT Device(s) 605 and/or generates permutations and/or combinations of those messages to push out, similar to the behavior of a fuzzer. It may record if certain combinations lead to a compromised state and/or if the devices show robustness and/and resilience in the face of different message combinations.

It may contain a test suite of one or many different tests. A test suite may be compiled from tests from developers and/or quality assurance teams who may script their own custom tests. Test suites may come from a low-code and/or no-code platform for creating custom tests, which may be found in a User Interface 645. Tests in a test suite may be automatically sent back to a Testbed 620 and/or to the IoT Device(s) 605 through their respective Interfaces and/or Protocols 615.

It may contain a configuration change tracker. A configuration change tracker may track the state of the devices, which may be derived from the configuration. It may track configuration changes and/or store those configuration changes so that those can later be analyzed and/or compared for changing behavior of the IoT devices based on different tests.

It may contain a module for disaster response and/or recovery. A disaster response and/or recovery module may respond to incidents based on potential risks. It may leverage mappings from a Compliance Mapping API 660. This may require multiple actions, including (but not limited to) damage and/or impact analysis, forensics, and/or mitigation/remediation/defense to rapidly stop and/or damage-restrict the attack. Defense may require reconfiguration of the system. Defense may include functional reconfiguration, e.g., redeploying and re-orchestration, and/or reconfiguration of the security mechanisms, e.g., access control rules, etc.

What is claimed is:

1. A method for analyzing computing devices for properties of at least one computer software comprised in at least one computing system, the method comprising:
   loading, via a processor, from a data storage, a memory, or via a communication device, or via a user entry through a user interface, at least one input data for the at least one computer software;
   determining, via the processor, at least one result pertaining to vulnerabilities present or expected to be present within the at least one computer software;
   mapping, via the processor, the vulnerabilities to frameworks, determining the at least one result pertaining to an outcome of the vulnerability-to-framework mapping;
   generating, via the processor, an output data describing the at least one result;
   storing, via the processor, the output data pertaining to the at least one result in the memory; and
   determining, via the processor, if the at least one result satisfies a predetermined condition, and if so, executing at least one action corresponding to the at least one result on the at least one computing system, wherein
   the predetermined condition comprises identified vulnerability meeting a severity threshold, identified vulnerability meets at least one predetermined vulnerability categories, identified failures to fulfill a framework requirement due to identified vulnerabilities, and identified weaknesses.

2. The method according to claim 1, wherein loading the at least one input data comprises receiving device metadata, receiving computer software metadata, receiving vulnerability data, emulating the at least one computer software, downloading the at least one computer software from a website, and/or extracting the at least one computer software from a computing device.

3. The method according to claim 1, wherein the at least one computer software comprises at least one of a compiled computer software, assembly code, pre-written bytecode, computer binary, dynamic linked library (dll) file, embedded device binary, firmware, intermediate representation, source code, middleware, control-flow graph, abstract syntax tree, full syntax tree, and/or device drivers.

4. The method according to claim 1, wherein the vulnerabilities present or expected to be present comprise at least one buffer overflow attack, weak pointers, weak cryptography, CVEs, CWEs, arbitrary code execution exploit, path reversal, remove code execution exploit, privilege escalation exploit, authentication bypass, signal hijacking, network protocol vulnerability, SQL injection, cross-site scripting, and/or forged network requests.

5. The method according to claim 1, wherein mapping the vulnerabilities to the frameworks comprises analyzing the vulnerabilities to predict matching controls of control frameworks, manual mapping by humans, lookups, machine-learning based mappings, artificial intelligence-based mappings, rule-based mappings, algorithmic mappings, statistical mappings, semi-automated mappings, analyzing mappings inputs from a single organization, analyzing mapping inputs from several organization, determining consensus across mappings, and ordering results.

6. The method according to claim 1, wherein the frameworks comprise cybersecurity frameworks, safety frameworks, assurance frameworks, compliance frameworks, privacy frameworks, explainability frameworks, quality frameworks, risk frameworks, MITRE, NIST, COBIT, ISA, GDPR, HIPPA, PCI DSS, NERC-CIP, Sarbanes-Oxley, ISO, FISMA, and/or IEC.

7. The method according to claim 1, wherein mapping the vulnerabilities to the frameworks comprises ordering by relevance, urgency, importance, criticality, impact, frequency, specificity, traceability, explainability, accuracy, confidence and/or prevalence.

8. The method according to claim 1, wherein the results comprise recommending fixes to code in the at least one computer software, replacing the at least one computer software, patches from a manufacturer that fix at least one of the vulnerabilities, changing a computer model that uses a different software, blocking an IP on a firewall, deleting a file, quarantining a file, and/or using devices or software that mitigates the at least one of the vulnerabilities.

9. The method according to claim 1, wherein the predetermined condition further comprises identified vulnerability meeting a severity threshold, identified vulnerability meeting a confidence threshold, identified vulnerability consensus across multiple cybersecurity tool results, identified vulnerability meets at least one predetermined vulnerability categories, identified vulnerability affects at least one predetermined system, identified vulnerabilities meeting a threshold of known previous incidences involving said vulnerabilities, identified failures to fulfill a framework requirement due to identified vulnerabilities, and/or identified mitigation for the at least one of the vulnerabilities, identified gaps in vulnerability-to-framework mapping, and/or identified weaknesses.

10. The method according to claim 1, wherein the at least action comprises data reporting, alerting, alarming, storing, transmitting, and/or displaying, of the at least one of the vulnerabilities, compliance issue, ordering, ordering by importance, confidence, mitigation, and/or control framework.

11. The method according to claim 10, wherein data reporting comprises data dashboards, Tableau, PowerBI, Qlik Sense, Looker, data spreadsheet, data report generated for a visual format, PDF document, document file, data stream, data provided to an API, data provided via a command line interface, data provided via a computer interface, data stored in a database, data transmitted via a networking interface, bitstreams, protobufs, JSON, XML, CSV, TXT, XLS, Avro, Apache Parquet, Apache ORC, and/or stored data to a physical media.

12. The method according to claim 1, wherein the at least one result further comprises information about mitigations, the vulnerabilities, compliance issues, historical analysis, consensus analysis, mappings, mappings carried out, mapping issues, mapping gaps, mapping coverage, mapping quality, locations of vulnerabilities, manufacturer patches, firmware updates, software updates, software, computing device information.

13. A system for analyzing computing devices for properties of at least one computer software comprised in the at least one computing system, the system comprising:
a processor;
a memory or a data storage that stores data and a program;
a communication device that communicates with the at least one computing system; and
a user interface that receives a user entry, wherein, when the program is executed by the processor, the processor is caused to:
load, via the processor, from the data storage, the memory, or via the communication device, or via the user entry through the user interface, at least one input data for the at least one computer software;
determine, via the processor, at least one result pertaining to vulnerabilities present or expected to be present within the at least one computer software;
map via the processor, the vulnerabilities to frameworks, determining the at least one result pertaining to an outcome of the vulnerability-to-framework mapping;
generate, via the processor, output data describing the at least one result;
store, via the processor, the output data pertaining to the at least one result in the memory; and
determine, via the processor, if the at least one result satisfies a predetermined condition, and if so, execute at least one action corresponding to the at least one result on the at least one computing system, wherein
the predetermined condition comprises identified vulnerability meeting a severity threshold, identified vulnerability meets at least one predetermined vulnerability categories, identified failures to fulfill a framework requirement due to identified vulnerabilities, identified mitigation for the at least one of the vulnerabilities, and identified weaknesses.

14. The system according to claim 13, wherein loading the at least one input data comprises receiving device metadata, receiving computer software metadata, receiving vulnerability data, emulating the at least one computer software, downloading the at least one computer software from a website, and/or extracting the at least one computer software from a computing device.

15. The system according to claim 13, wherein the at least one computer software comprises at least one of a compiled computer software, assembly code, pre-written bytecode, computer binary, dynamic linked library (dll) file, embedded device binary, firmware, intermediate representation, source code, middleware, control-flow graph, abstract syntax tree, full syntax tree, and/or device drivers.

16. The system according to claim 13, wherein the vulnerabilities present or expected to be present comprise at least one buffer overflow attack, weak pointers, weak cryptography, CVEs, CWEs, arbitrary code execution exploit, path reversal, remove code execution exploit, privilege escalation exploit, authentication bypass, signal hijacking, network protocol vulnerability, SQL injection, cross-site scripting, and/or forged network requests.

17. The system according to claim 13, wherein mapping the vulnerabilities to the frameworks comprises analyzing the vulnerabilities to predict matching controls of control frameworks, manual mapping by humans, lookups, machine-learning based mappings, artificial intelligence-based mappings, rule-based mappings, algorithmic mappings, statistical mappings, semi-automated mappings, analyzing mappings inputs from a single organization, analyzing mapping inputs from several organization, determining consensus across mappings, and ordering results.

18. The system according to claim 13, wherein the frameworks comprise cybersecurity frameworks, safety frameworks, assurance frameworks, compliance frameworks, privacy frameworks, explainability frameworks, quality frameworks, risk frameworks, MITRE, NIST, COBIT, ISA, GDPR, HIPPA, PCI DSS, NERC-CIP, Sarbanes-Oxley, ISO, FISMA, and/or IEC.

19. The system according to claim 13, wherein mapping the vulnerabilities to the frameworks comprises ordering by relevance, urgency, importance, criticality, impact, frequency, specificity, traceability, explainability, accuracy, confidence and/or prevalence.

20. The system according to claim 13, wherein the results comprise recommending fixes to code in the at least one computer software, replacing the at least one computer software, patches from a manufacturer that fix at least one of the vulnerabilities, changing a computer model that uses a different software, blocking an IP on a firewall, deleting a file, quarantining a file, and/or using devices or software that migrates the at least one of the vulnerabilities.

21. The system according to claim 13, wherein the predetermined condition comprises identified vulnerability meeting a severity threshold, identified vulnerability meeting a confidence threshold, identified vulnerability consensus across multiple cybersecurity tool results, identified vulnerability meets at least one predetermined vulnerability categories, identified vulnerability affects at least one predetermined system, identified vulnerabilities meeting a threshold of known previous incidences involving said vulnerabilities, identified failures to fulfill a framework requirement due to identified vulnerabilities, identified mitigation for the at least one of the vulnerabilities, and/or identified gaps in vulnerability-to-framework mapping, and/or identified weaknesses.

22. The system according to claim 13, wherein the at least action comprises data reporting, alerting, alarming, storing, transmitting, and/or displaying, of the at least one of the vulnerabilities, compliance issue, ordering, ordering by importance, confidence, mitigation, and/or control framework.

23. The system according to claim 22, wherein data reporting comprises data dashboards, Tableau, PowerBI, Qlik Sense, Looker, data spreadsheet, data report generated for a visual format, PDF document, document file, data stream, data provided to an API, data provided via a command line interface, data provided via a computer interface, data stored in a database, data transmitted via a networking interface, bitstreams, protobufs, JSON, XML, CSV, TXT, XLS, Avro, Apache Parquet, Apache ORC, and/or stored data to a physical media.

24. The system according to claim 13, wherein the at least one result further comprises information about mitigations, the vulnerabilities, compliance issues, historical analysis, consensus analysis, mappings, mappings carried out, mapping issues, mapping gaps, mapping coverage, mapping quality, locations of vulnerabilities, manufacturer patches, firmware updates, software updates, software, computing device information.

* * * * *